United States Patent [19]
Dummersdorf et al.

[11] Patent Number: 5,108,718
[45] Date of Patent: Apr. 28, 1992

[54] METHOD FOR THE DESTRUCTION OF TOXIC WASTE PRODUCTS AND A PLASMA CHEMICAL REACTOR

[75] Inventors: Hans-Ulrich Dummersdorf; Robert Kunze; Gert Wohllebe, all of Grimma; Dietrich Hebecker, Leipzig; Werner Noack, Grimma; Heinz Dummersdorf, Grimma; Wolfgang Jahn, Grimma; Hartmut Merten, Dresden, all of German Democratic Rep.

[73] Assignee: VEB Chemieanlagenbaukombinat Leipzig/Grimma, Grimma, German Democratic Rep.

[21] Appl. No.: 380,169

[22] Filed: Jul. 14, 1989

[30] Foreign Application Priority Data

Aug. 11, 1988 [DD] German Democratic Rep. .................................... 3188324
Aug. 11, 1988 [DD] German Democratic Rep. .................................... 3188332

[51] Int. Cl.⁵ .............................................. B01J 19/08
[52] U.S. Cl. ............................ 422/186.23; 204/169; 110/238; 110/250; 110/346; 110/247
[58] Field of Search ............... 422/186.23; 110/250, 110/346, 238, 247; 204/169

[56] References Cited

U.S. PATENT DOCUMENTS

| | | | |
|---|---|---|---|
| 4,644,877 | 2/1987 | Barton et al. | 110/250 |
| 4,770,109 | 9/1988 | Schlienger | 110/247 |
| 4,831,944 | 5/1989 | Durand et al. | 110/346 |
| 4,886,001 | 12/1989 | Chang | 110/346 |
| 4,896,614 | 1/1990 | Kulkarni | 110/346 |
| 4,909,164 | 3/1990 | Shohet et al. | 110/346 |

OTHER PUBLICATIONS

"Proceedings of the first International EPRI Plasma Symposium", May 1980, CMP Report No. 90-9, Papers No. 11, 16 and 28.

*Primary Examiner*—Robert L. Stoll
*Assistant Examiner*—N. Bhat
*Attorney, Agent, or Firm*—Jordan and Hamburg

[57] ABSTRACT

Toxic wastes are destroyed by contact thereof with a steam plasma jet and immediately thereafter with an oxidizing medium followed by washing of the resultant gaseous product with an alkaline medium. An apparatus for carrying out this method is in the form of a tubular assembly adapted to be received on a plasmatron in axial alignment therewith.

8 Claims, 1 Drawing Sheet

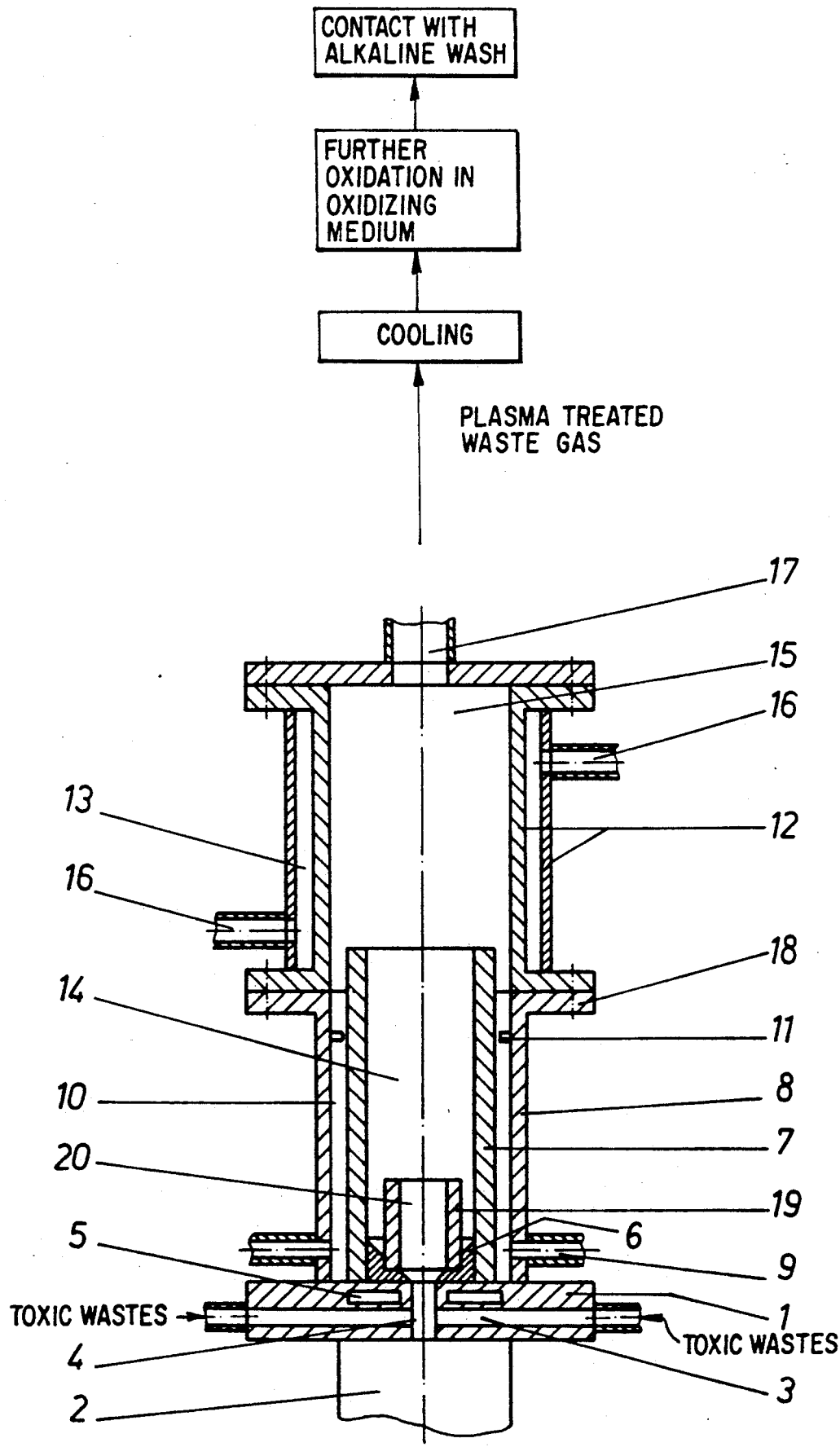

METHOD FOR THE DESTRUCTION OF TOXIC WASTE PRODUCTS AND A PLASMA CHEMICAL REACTOR

The invention is applicable for the destruction of stable solid, gaseous, liquid or pasty toxic substances or waste products of any composition containing toxic substances, in particular those containing chlorinated or fluorinated compounds, such as occur in the chemical industry, the microelectronics industry and other branches of industry.

Waste products of chemical reaction, treatment and synthesizing processes presently occur in great quantity in all industrial nations of the world. In this connection, some of these solid, liquid or gaseous wastes contain highly toxic and directly physiologically active or carcinogenic substances, or even substances that are genetically active or are suspected of being so. These include, for example, perchlorinated or polychlorinated (or perfluorinated or polyfluorinated) aliphatic or aromatic compounds, dioxins, furans, and inorganic compounds, such as fluorides, borides, polychlorinated biphenyls, etc. In addition to their hazardous nature and toxicity, substances of this kind usually exhibit high chemical and thermal stability and are generally present in waste products in relatively low concentrations (ppm range), which in no way reduces their riskiness, but further limits processing possibilities. In addition, numerous (up to several hundred) toxic species may occur side by side in a waste product. Typical of this group of waste products are production residues of the chemical or pharmaceutical industry and those that occur in the etching of printed circuits (chips) in the microelectronics industry.

For the reasons indicated, only two methods for the disposal of contaminated materials have become established worldwide:
direct landfilling and
high-temperature incineration.

In the first method mentioned, waste products are generally not destroyed and must, at great expense and with special safety precautions, be placed in atmospherically secure and ground-water-tight landfills which must be constantly monitored and which, in the final analysis, despite everything, represent a permanent hazard.

The high-temperature incineration method (for example, the rotary kiln system) operates in the region of 1000° C. and has the following disadvantages:
1. The temperatures achieved generally do not suffice to destroy all harmful substances; basically, only a reduction in their quantity can be obtained.
2. Discharge of the most thermally stable pollutants (for example, polychlorinated aromatic compounds) into the atmosphere, because in every incineration process nonhomogeneous temperature fields, which permit a constant emission of pollutants from colder zones in the flue-gas stack and thereupon into the atmosphere, are present in the incineration stage.
3. There may be additional formation of dioxins and furans in the region of several hundred °C. in certain zones of the combustion chamber. This fact is the reason for the dioxin emissions detected from hazardous waste incinerators.
4. Problems occur in the destruction of noncombustible wastes. Harmful substances from the waste material are volatilized into the gaseous phase and unconverted toxins are thereupon discharged into the atmosphere.

Other disadvantages of rotary kiln systems consist in an uncontrollable volatilization of gases through the openings at the inlet and outlet of the kiln and contamination of the interior of the kiln.

The two methods mentioned (landfilling and high-temperature incineration) are not suitable for the destruction of harmful substances in gaseous waste products.

For this group of wastes, adsorption and absorption methods are used in, for example, the area of disposal of toxic waste gases of the etching process for the manufacture of microprocessors, by which methods at least a partial removal of harmful substances from the waste gas is obtained, thus protecting the atmosphere. (JP—Patent 58-122,025, JP—Patent 62-30,525, JP—Patent 62-136,230, JP—Patent 59-109,227, JP—Patent 60-44,025.

The chief disadvantage of these methods, however, consists in that toxins are not eliminated, but solid and/or liquid absorption agents contaminated with like or higher concentrations of harmful substances are produced, for which only storage in a landfill, with all the known disadvantages mentioned at the beginning, is possible.

In addition, it is known that plasma pyrolysis and plasma incineration methods may be used for eliminating harmful substances. The plasma arc incineration method words with the use of an air plasma. The plant is equipped for liquid and solid wastes with a rotary plasma reactor to ensure rotation of the arc. In the rotary plasma reactor the arc acts directly on the wastes. This requires relatively high technical expenditures and has a tendency to be troublesome, there being the risk of escape of harmful substances through moving parts. Likewise disadvantageous is the existence of strong temperature fields between arc zones and other reactor space, so that the risk of escape of harmful substances through relatively cold reactor zones is always present.

In addition, the use of air as plasma gas has several basic disadvantages:
1. At the high temperatures coming into play, particularly in the region of the arc plasma, nitric oxides are formed, which are additional pollutants.
2. When air is used as plasma gas, the ratio of chemically reactive to chemically inert plasma components is only on the order of 1:4 (20% oxygen, 80% nitrogen). This is a result of the fact that nitrogen, as the chief component of the air used, forms hardly any reactive species even under plasma conditions, since the process of its dissociation into reactive atoms sets in only above 5000° K. while to conserve energy a plasma temperature of 3500° K. should not be exceeded in this method. All the nitrogen used thus becomes only thermally active. Another disadvantage resulting directly from this consists in that, owing to the nitrogen not dissociating in the operating range of the process, only an essentially reduced energy density is obtained.
3. The method is unsuitable especially for the conversion of highly chlorinated or highly fluorinated hydrocarbons poor in hydrogen, such as occur, for example, in waste gases of the microelectronics industry, since great quantities of chlorine and fluorine, which cannot be bound (e.g., by hydrogen in the form of HCl), are released from the products in molecular form.

4. Atomic hydrogen for atomic transfer reactions is lacking for the destructive breakdown of toxins of complicated structure.

Owing to parts being moved mechanically with release of mechanical dust, the plasma incineration method fails to meet the high cleanliness requirements that exist in the white and gray zones of the microelectronics industry. Other shortcomings of the plasma incineration method for the microelectronics industry are its relatively high space requirements as well as the factors, alluded to previously, of creating risk of escape of harmful substances from rotary plasma reactors.

As another solution for the destruction of toxic wastes, the accomplishment of plasma pyrolysis by means of a $H_2$ plasma for liquid and gaseous wastes is described in DD Patent 245 941. This method has the following technical disadvantages:

1. Hydrogen plasma is not chemically aggressive enough, especially with respect to stable polychlorinated aromatic compounds.
2. The resultant atmosphere, strongly reduced by the hydrogen plasma, acts disadvantageously on the object of the method since, although basically the opportunity for the completion of atomic transfer reactions effecting the successive cleavage of margin H and Cl atoms in the waste products and their stable bonding in $H_2$ or HCl is possible, no possibility of lasting destruction of the carbon structure exists, i.e., cores of stable pollutants of higher molecular structure are preserved.
3. The method requires a quench stage. The uncontrolled formation of new pollutants, with an altered chemical structure, from the undecomposed cores of the original hydrocarbons is then favored in the hydrogen plasma. However, the method fails to ensure any stable (harmless) bonding of the carbon present in the toxic wastes.
4. The strongly reducing atmosphere of the plasma pyrolysis stage always lead to the formation of soot (pyrolytic coke) from the organic products introduced. This results in the following disadvantages:
4.1 It is necessary to clean individual process stages at given intervals, deposited soot and representing a contamination threat to plant personnel.
4.2 The soot, once basically formed in the plasma pyrolysis stage, represents a problem in the combustion stage with air or oxygen following the quench pursuant to the method, since it is hard to effect heterogeneous soot combustion completely in a flow reactor and the risk of escape of contaminated soot particles in subsequent process stages or into the atmosphere exists.
4.3 A plasma pyrolysis stage must always be operated at slight excess pressure to prevent the formation of explosive mixtures. This results in the certain escape of soot into the environment, which would have catastrophic effects on, for example, the clean-room zones of a chip factory.
5. Because of the pyrolytic reaction going on, the plasma pyrolysis stage has an endothermal character, owing to which an axial cooling of the plasma jet takes place. The consequence o this is a lower operating temperature of the subsequent combustion stage. Since new chlorinated hydrocarbons or hydrocarbon cores which have a high stability are produced from the chlorine in the plasma pyrolysis stage, their elimination, in the final analysis, is not ensured.
6. The method is not suitable for the conversion of inorganic constituents of waste products (e.g., silicon, vanadium, boron compounds), since poisonous organometallic compounds (e.g., $BH_3$) are produced from them in the plasma pyrolysis stage or the quench stage.
7. In the subsequent combustion stage pursuant to the method, there is the difficult task of having to definitely burn up a number of undefined chemical compounds simultaneously.

DE OS 3427 710 describes a device for the plasma pyrolysis of waste products directly in the arc. The remarks made above concerning DD WP 245 941 apply analogously to this method.

In addition, methods for the disposal (incineration) of municipal waste are known (DE OS 3605 785, DE OS 3524 316, DE OS 3424 710).

Owing to the technical problems described in the destruction of highly stable toxic substances, a small portion of these products, occurring in the chemical and microelectronics industry as well as other branches of industry, is at present incompletely burned in conventional high-temperature incinerators with the disadvantages mentioned, while the major portion is transported to hazardous waste landfills for ultimate storage.

At the same time, the quantity of hazardous waste being stored is greatly increasing all over the world, so that there is greater and greater difficulty in finding and opening suitable landfills (especially in heavily populated regions), and these products are increasingly entering the environment through waste and air.

Regardless of the process employed, because of their high thermal loading owing to the plasma jet, plasma-chemical reactors are always provided with devices that permit intensive water cooling. Only in this way is it possible to use steel or temperature-resistant steel or copper, brass, etc. as reactor material for shielding the plasma-chemical process from the environment. The necessary cooling of the reactors leads to the development of a sometimes strong radial temperature gradient between core zones of the plasma jet and the reactor wall. This results in the disadvantage that some of the raw materials injected into the plasma jet and found in the region near the wall exhibit considerably lower reaction rates. In some plasma-chemical methods (for example, the pyrolysis of natural gas) this need not absolutely prove to be a fundamental disadvantage, since unreacted natural gas in the reactor zones near the wall can be returned to circulation in the reactor, although a comparatively great reduction in thermal efficiency or reduction in reaction is always associated with the necessary wall cooling. Known in addition are forms of reactors in which the reactor is provided with an inlay of temperature-resistant and/or chemically resistant material, for example, pyrolytic graphite. Although in principle efficiency can thereby be improved, problems occur because owing to the necessary mechanical connection between inlay and reaction jacket and their unlike thermal expansion upon heating to high temperatures, mechanical stresses or alternating stresses (due to starting and stopping processes) occur, leading to fatigue of the inlay material or to reactor failure. A variety of plasma-chemical methods are known for the destruction of toxic waste products either by plasma pyrolysis or by plasma incineration by means of $H_2$- or air plasma (DE—OS 3424 710, DD—WP 245 941, DE —OS 3605 785, DD—WP 158 128), whose subject matter, however, is not a reactor design that avoids the disadvantages of the known types of construction. One known plasma incineration method works by a direct action of the arc on the substances to be reacted, where owing to strong temperature gradients between regions inside and outside the arc zone a uniform reaction cannot be obtained. The consequence and disadvantage consists in the necessity for use of a second plasma reactor for the subsequent reaction.

The known types of reactor design all have the disadvantage of a possible escape of pollutants through the cool zones near the wall and therewith contamination of the subsequent process stage or the environment. However, to achieve a high degree of decontamination, one must if necessary put up with the disadvantage of arranging two plasmatrons in tandem, with a plasma reactor in each instance, where in addition to higher equipment and energy costs, although the risk of escape of pollutants is reduced, it is not completely ruled out. Moreover, in known reactor designs the problem of overcoming thermal stresses and of resistance to temperature cycling occurs.

The object of the invention is to destroy, neatly and non-specifically, and to convert into harmless and environmentally sound products all toxic substances contained in hazardous wastes, for example dioxins, furans, polychlorinate biphenyls, perchlorinated and/or polychlorinated (as well as perfluorinated and/or polyfluorinated) aliphatic or aromatic compounds, silicon chloride, silicon fluoride, silicon-organic or organometallic compounds, boron compounds, etc. Required for this purpose is a reactor that guarantees 100% reaction of the substances introduced in only one plasma-chemical stage with high temperature resistance and resistance to thermal cycling, so that escapes of pollutants due to cold reactor zones are precluded.

SUMMARY OF THE INVENTION

Pursuant to the invention, the object is accomplished by a method in which the toxic wastes, of liquid, solid, pasty or gaseous consistency, are introduce directly into a plasma jet of steam. The residence time in a subsequent plasma reaction stage amounts to $10^{-3}$ s or longer. In a secondary reaction stage subsequent to the plasma reaction stage, the plasma jet is exposed to the action of an oxidizing medium for a period of $10^{-2}$ s or longer. There the temperature, allowing for residual enthalpy, amounts to at most 1500° C. The product gas obtained in then subjected to an alkaline wash. The oxidizing quench medium may be air or some other gas mixture containing free oxygen. In a preferred embodiment of the alkaline was the product gas is prewashed in a pre-absorber with an alkaline solution, cooled down to a temperature below 100° C. and then rewashed in a packed column, where cooling to ambient temperature takes place. Gaseous, liquid and pasty wastes are advantageously introduced directly into the steam plasma jet, while solid wastes are ground up to a particle size below 300 μm and introduced into the steam plasma jet by means of an entraining gas.

A plasma-chemical reactor pursuant to the invention, which is connected with a plasmatron by way of a flange, is suitable for carrying this method into effect.

The flange has radial channels for injecting the toxic wastes or other materials into the centrally arranged plasma jet channel In the plasma reactor the flange is connected to a conical expansion ring whose interior serves as a mixing chamber. On it is loosely seated a cylinder of high-temperature resistant material, the interior of which represents the plasma reaction stage. At a distance from the latter, the cylindrical outer jacket of the reactor is arranged coaxially. It bears spacer pins to keep it at a distance from the cylinder, which ensure the maintenance of a symmetrical annular slot between the cylinder and the outer jacket. The outer jacket has feed connections in the lower part turned toward the plasmatron. It is shorter than the cylinder, so that he latter projects into a secondary reaction stage. This reaction stage is formed by a double-jacketed cylinder that has the same inside diameter as the outer jacket and is connected to the latter by flanges. The double-jacketed cylinder includes an annular slotlike cooling-water channel and has feed connections for cooling medium.

It can be advantageous to arrange coaxially in the high-temperature-resistant cylinder an additional high-temperature-resistant cylinder with a smaller diameter which at most has only half the length of the aforementioned cylinder and is fixed with a press fit on the conical expansion ring.

The operation of the method pursuant to the invention is based on the fact that the steam plasma exists in a state of chemical equilibrium which corresponds to its average mass temperature and is characterized in that a large part of the original water molecules is split into extremely reactive radicals such as, for example, hydrogen atoms or an ionic and electron gas component. The temperature of at least 1500° C. is required, especially because chlorinated or fluorinated hydrocarbons (for example, hexachlorobenzene) are stable up to about 1300° C.

After mixing with the harmful substances, the steam plasma acts on them thermally as well as chemically, which produces rapid reactions with high degrees of reaction between the two components. Its specificity consists in exerting, successively or simultaneously, three effects on the toxins introduced: First of all, the generally larger molecules of the toxins are split into smaller fragments by thermal action, i.e., by a bombardment of high-energy constituents of the steam plasma. The next important step consists in breaking the marginal chlorine of fluorine atoms out of the basic hydrocarbon structure by chemically highly reactive hydrogen atoms with the formation of HCl or HF, which under the present conditions represent relatively stable compound that are ultimately stabilized upon later cooling. In the third step of the mechanism of action of the steam plasma, the remaining dechlorinated or defluorinated hydrocarbon core is converted, particularly by the chemical attack of oxygen-containing radicals such as $HO_2$, $OH$, $O$ or $O_2$, into the the stable definite compounds $CO$ and $H_2$, in which the hydrocarbon or hydrogen substance is ultimately and completely fixed stably, with no ref-formation to compounds of higher molecular weight being possible. An essential characteristic of the invention thus consists in utilization of the parallel occurrence of H atoms and and oxygen radicals in the steam plasma, so that two important objects may be accomplished simultaneously:

dechlorination or defluorination of the hydrocarbon core of the margin halogen atoms and fixing gasification of the hydrocarbon core.

Any silicon or boron compounds (for example, $BH_3$) or organo-metallic compounds contained in the primary product are converted by the presence of oxygen compounds into their oxides and are thereby likewise converted into harmless compounds. Any sulfur present in the waste is converted into $H_2S$ or $SO_2$. Depending upon the steam plasma enthalpy displayed before introduction of the pollutants and the molecular size of the toxins, the process described requires a minimum reaction time of $10^{-3}$ s. After completion of the optimal reaction time depending upon the type and nature of the wastes and the plasma enthalpy chosen, the plasma jet, which may now consist of HCl, HF, CO, $H_2$, $H_2S$, $SO_2$, metallic or semimetallic oxides such as $SIO_2$, $B_2O_5$, etc. and of inert components (for example, $N_2$) optionally contained in the primary product, is then cooled by injection of an oxidizing medium (for example, air), where any radicals still present recombine and the temperature of the plasma jet is reduced (to at most 1500° C.) so that conversion of the plasma into the customary gaseous state takes place. With utilization of the residual enthalpy of the gas, a complete and selective oxidation of the stable combustibles present in the gas (CO, $H_2$, $H_2S$) takes place with the oxygen of the quenching gas. After this process step the product gas contains HCl, HF, $CO_2$, water vapor, possibly $SO_2$ and metallic or semimetallic oxides or elements and optionally $N_2$. The components HCl, HF, $SO_2$ and in some cases $CO_2$, are now removed from the product gas in the succeeding two-stage basic caustic soda wash and a completely harmless gas mixture, consisting of $CO_2$, water vapor and possibly $N_2$, is discharged to the environment. In principle, 100% detoxification may be obtained by the method pursuant to the invention. Gaseous, liquid or tarry-pasty wastes, but also solid pollutants ground to small particle sizes may be eliminated in similar fashion.

The operation of the plasma reactor will be explained by means of a technological example:

While conventional water-cooled plasma reactors exhibit strong radial temperature fields, which leads to the escape of toxins through cold zones near the wall, the plasma reaction stage of the plasma-chemical reactor pursuant to the invention is cooled by air supplied via the feed connections in the lower part of the reactor. This makes it possible to increase the average temperature of the plasma reaction stage (for example, to 2500° C.) with a core temperature of the plasma on the axis of the zone of about 3000° C., while the wall temperature on the inside of the high-temperature-resistant cylinder is brought up to about 2000° C., which definitely ensures a splitting of all marginal halogens. This means that escapes of pollutants through the primary plasma reaction zone are not longer possible and the toxins contained in the waste introduced are completely converted into CO, $H_2$ and HCl. After reaction in the plasma reaction stage, the reactive plasma flows into the secondary reaction stage, where mixing with the heated cooling air from the annular slot takes place; there cooling to about 1500° C. takes place, this temperature suffices to oxidize the stable combustible $H_2$, CO, formed in the plasma reaction stage by plasma-chemical gasification, to $CO_2$ and $H_2O$. The plasma reaction stage by plasma-chemical gasification. This is achieved because the shape of the reactor pursuant to the invention, with a plurality of zones merging into one another, in particular the direct connection between the annular slot cooling zone of the plasma reaction stage and the secondary reaction stage, permits repeated utilization of the air supplied via the feed connections, on the one hand as cooling medium and on the other as heated oxidizing agent, making the oxidation process feasible and problem-free. In the secondary reaction stage a controlled oxidation of stable combustibles takes place and, because of exothermy, water-cooling of this zone is effected via the cooling-water channel.

The reaction products $CO_2$, water vapor and HCl are removed via the gas discharge.

Owing to the mounting of the cylinder with one end free and with free three dimensional expansion being accommodated by the conical expansion ring and the mounting of the spacer pins at a distance from the cylinder, despite the high thermal load (up to 2000° C.) and the high temperature variation stress on the cylinder, no thermal or mechanical stresses of any kind occur and a long service life of the reactor is thereby ensured.

In addition, sealing problems no longer occur in the reactor pursuant to the invention, since owing to a higher pressure loss in the annular slot (due to high flow velocity) than int he plasma reaction stage at the point of transition between plasmatron flange and cylinder, sealing is basically no longer necessary. There is always a small stream of cooling air from the annular slot into the plasma reaction zone, which does not have a negative effect on the plasma reactions in the plasma reaction stage, but never an escape of toxins from the plasma reaction stage into the annular slot, owing to the prevailing pressure difference. For this reason, clamping of the cylinder is unnecessary and thermal and mechanical stresses are avoided.

BRIEF DESCRIPTION OF THE DRAWING

The drawing is a cross sectional view of an apparatus according to the invention.

DETAILED DESCRIPTION OF PREFERRED EMBODIMENTS

The invention is explained below by means of an example of a concrete detoxification task.

EXAMPLE

The detoxification task consists in totally detoxifying a stream of waste gas having an average flow rate of 7 $m^3/h$ and the composition (vol-%)

90% $N_2$
3% chlorinated hydrocarbons
  (>300 perchlorinated compounds)
4% $BCl_3$
2% $Cl_2$
1% Hcl and converting it into an environmentally sound gas generally recognized as safe to humans and the biosphere. To this end, the stream of waste gas is injected radially into a plasma-chemical reaction in which is found a steam plasma jet that is fed from a plasmatron and has the following parameters:

| | |
|---|---|
| quantity of steam: | 1.5 kg/h |
| output of plasma jet: | 6.6 kW |
| average mass temperature of plasma: | 2900° C. |
| chemical equilibrium composition of plasma at average mass temperature in percent by volume: | $H_2O$ 50.00 |
| | $H_2$ 16.00 |
| | H 10.00 |
| | OH 12.36 |
| | O 4.70 |
| | $O_2$ 5.50 |

After intermixture of waste gas and steam plasma jet in a mixing zone, where an average mass temperature of about 2000° C. is attained, all of the chemical reactions (plasma-chemical dehalogenation and fixing gasification) take place in the primary reaction stage 14 in the plasma reactor connected with the plasmatron 2. At the end of the reaction stage 14, after completion of the reaction time, 10 m$^3$/h preheated air is admixed in a subsequent secondary reaction stage 15, whereby simultaneous "quenching" of the plasma jet and a secondary reaction in the form of a selective oxidation of the stable combustibles $H_2$ and CO formed in the plasma reactor take place. After the secondary reaction stage, the gas stream flows at about 17 m$^3$/h, consists of HCl, $H_2$, $CO_2$, water vapor and $O_2$, and has a temperature of about 1500° C. In a subsequent pre-absorber this gas stream is sprayed with 500 l/h caustic soda, the two phases being carried in parallel flow. The flow of caustic soda is sized so that the gas stream is cooled down to about 100° C., with no evaporation of the caustic solution. The gas phase and the liquid caustic soda are removed separately from the pre-absorber, where part of the HCl is simultaneously absorbed in order to relieve the subsequent packed column, the caustic soda being supplied to the absorption layer of the subsequent packed column, while the gas phase is brought in below the packed fill.

After the main wash of the gas stream in the packed column, the gas stream consists only of $N_2$, $O_2$, $CO_2$ and water vapor and may be safely discharged into the environment via the gas stack. However, it may alternatively be advantageous to undertake a selective quenching instead of the secondary reaction stage for the incineration of stable combustibles from the plasma reaction stage. Such quenching leads to the formation of the same hydrogen halides as in slower cooling and in the formation of hydrocarbons that may put to further use. The oxygen content of the cooling medium may be reduced for this.

The drawing shows the basic reactor design with an additional coaxial cylinder of high-temperature-resistant material as a preferred variant.

The reactor is connected with the plasmatron 2 by the plasmatron flange 1. In the plasmatron flange 1 are found radial channels 3 for the feed of waste, the axial plasma-jet channel 4, designed as admixing chamber, and an annular cooling-water channel 5. On the plasmatron flange 1 is mounted an expansion ring 6, frustoconical in the interior the wider axial end of the frustoconical opening being remote from the plasmatron 2, about which ring 6 is seated on the plasmatron flange 1, a cylinder 7 of silicon carbide, fixed in its position by the ring 6. The cylinder 7, open at the top, is surrounded coaxially by the outer jacket 8 of the plasma reactor, feed connections 9 for cooling air being located in the immediate vicinity of the plasmatron flange 1. Between the cylinder 7 and the outer jacket 8 are found spacer pins 11, which fix the position of the cylinder 7 in its upper region without the imposition of strain at operating temperature. In this connection, between the cylinder 7 and the outer jacket 8 there is formed an annular space 10 for cooling air. In axial extension of the outer jacket 8 there is mounted, by means of a flange 18, a double-jacketed cylinder 12 with a cooling-water channel 13 and corresponding cooling-water-feed connections 16 and a centrally arranged gas discharge 17. The cylinder 7 ends behind i.e., downstream of the flange 18 in the secondary reaction stage 15. The plasma reactor is therewith divided into zones 4, 10, 14, 15 merging into one another.

An addition to the plasma reactor is produced when, for example, another cylinder 19 of silicon carbide having a smaller axial length and a smaller diameter than the cylinder 7 is inserted into a groove of the conical expansion ring 6, whereby an additional mixing space 20 having a smaller diameter is formed for stream plasma and waste, in the upper region of which, at the transition between the mixing space 20 and the plasma reaction stage 14, intensive turbulences are formed due to the presence of the stubby edge of the silicon carbide cylinder 19.

The reactor pursuant to the invention, with the method pursuant to the invention, permits a complete destruction of even highly stable wastes by achieving high core and wall temperatures and ensures and optimal utilization of energy through single-stage operation and utilization of the cooling-air zone as preferable means for isolating the plasma jet from the environment by simultaneously employing the heated cooling air as oxidizing agent. It works with a high degree of thermal efficiency and a long service life despite the high thermal loading of the reactor material. In addition, it may alternatively be used for the other plasma-pyrolytic process.

Along with the chief advantages of a complete elimination of toxic wastes, the inventions exhibit a variety of additional advantages:

Use of inexpensive steam as plasma gas

Elimination of concentration, intermediate storage and transport of hazardous wastes Elimination of the development of hazardous waste landfills No new toxic products are formed in the process.

Destruction of all toxic compounds, including those of inorganic nature in the waste The inventions meet the high white- and gray-zone requirements of the microelectronics industry The method is equally suitable for the destruction of liquid, solid, pasty and gaseous products and is therefore universally applicable.

The method and the reactor are alternatively usable for toxic wastes which are not very stable and which decompose at temperatures below 1300° C. in other reaction processes.

We claim:

1. Method for the destruction of toxic wastes, comprising contacting toxic wastes containing at least one member selected from the group consisting of fluorinated and chlorinated hydrocarbons (1) with a stream plasma jet for a period of at least $10^{-3}$ second and (2) immediately thereafter with an oxidizing medium at a temperature no higher than 1500° C. and for a period of at least $10^{-2}$ second thereby to produce a gaseous product and (3) contacting the gaseous product with an alkaline wash medium.

2. Method according to claim 1, in which the wastes are gaseous, liquid or pasty and contacted in those forms with the steam plasma jet.

3. Method according to claim 1, in which the wastes are solid and further comprising, prior to contacting the wastes with the steam plasma jet, grinding the wastes to a particle size of under 300 μm and entraining the particles in gas, the contacting with the steam plasma jet being effected by conducting the entrained particles into the jet.

4. Method according to claim 1, in which the oxidizing medium is a gas mixture containing free oxygen.

5. Method according to claim 4, in which the oxidizing medium is air.

6. Method according to claim 1, in which the step of contacting the gaseous product with an alkaline wash medium comprises prewashing the gaseous product in a pre-absorber with alkaline solution and then rewashing the prewashed product with alkaline solution in a packed column where cooling to ambient temperature takes place.

7. Plasma-chemical reactor for the destruction of toxic wastes, said reactor being adapted to be connected to a plasmatron in axial alignment therewith, comprising a tubular assembly having at one end a flange adapted to be mounted on a plasmatron, an axial channel formed through the flange for receiving a plasma jet from the plasmatron, radial channels formed in the flange in communication with the axial channel for conducting toxic wastes into the axial channel, an expansion ring received on a face of the flange opposite a face of the flange adapted to be received on the plasmatron, the ring having an axial bore in the form of an inverted frustocone in axial alignment with the axial flange channel and with its smaller mouth resting on the flange, a tubular member of high temperature resistant ceramic of poor thermal conductivity having a first end resting on the flange with the expansion ring loosely and coaxially received in the tubular member, a cylindrical outer jacket having a first end received on the flange with the tubular member coaxially received in the jacket, the jacket being shorter than the tubular member, an annular space being formed between the tubular member and the jacket, radial spacer pins extending from the jacket into the annular space, but not gripping the tubular member, for centering the tubular member without imposing strain thereupon, the other end of the jacket having a flange formed thereon, received on the jacket flange in axial alignment therewith a double-walled tubular member having a first end with a flange formed thereon which is received on the jacket flange and having an inner wall of the same internal diameter as the jacket, the tubular member extending a relatively small distance into the double-walled tubular member, and respective conduit means communicating with said annular space and with an annular space between the walls of the double-walled tubular member.

8. Plasma-chemical reactor according to claim 7, in which an annular groove is formed in the expansion ring and comprising an additional tubular member of high temperature resistant ceramic of poor thermal conductivity, the additional tubular member being coaxially received in the expansion ring with the lower end thereof resting on the annular groove and being of smaller diameter and no more than half the length of the other tubular member of high temperature resistant ceramic of poor thermal conductivity.

* * * * *